(12) United States Patent
Kwon et al.

(10) Patent No.: US 10,381,004 B2
(45) Date of Patent: *Aug. 13, 2019

(54) DISPLAY APPARATUS AND METHOD FOR REGISTRATION OF USER COMMAND

(71) Applicant: Samsung Electronics Co., Ltd., Suwon-si (KR)

(72) Inventors: Nam-yeong Kwon, Anyang-si (KR); Kyung-mi Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,722

(22) Filed: Oct. 17, 2017

(65) Prior Publication Data

US 2018/0040321 A1 Feb. 8, 2018

Related U.S. Application Data

(63) Continuation of application No. 14/921,237, filed on Oct. 23, 2015, now Pat. No. 9,830,908.

(30) Foreign Application Priority Data

Nov. 20, 2014 (KR) .................. 10-2014-0162654

(51) Int. Cl.
*G10L 15/22* (2006.01)
*G10L 15/06* (2013.01)
(Continued)

(52) U.S. Cl.
CPC ............ *G10L 15/22* (2013.01); *G06F 3/167* (2013.01); *G10L 15/02* (2013.01); *G10L 15/06* (2013.01);
(Continued)

(58) Field of Classification Search
CPC ....................................... G10L 15/22
(Continued)

(56) References Cited

U.S. PATENT DOCUMENTS 7,899,673 B2 3/2011 Brown
8,213,995 B2 7/2012 Oh et al.
(Continued)

FOREIGN PATENT DOCUMENTS

CN 102004624 4/2011
CN 103313018 9/2013
(Continued)

OTHER PUBLICATIONS

European Office Action dated Sep. 26, 2016 in European Patent Application No. 15194814.8.
(Continued)

*Primary Examiner* — Susan I McFadden
(74) *Attorney, Agent, or Firm* — Staas & Halsey LLP

(57) ABSTRACT

A display apparatus includes an input unit configured to receive a user command; an output unit configured to output a registration suitability determination result for the user command; and a processor configured to generate phonetic symbols for the user command, analyze the generated phonetic symbols to determine registration suitability for the user command, and control the output unit to output the registration suitability determination result for the user command. Therefore, the display apparatus may register a user command which is resistant to misrecognition and guarantees high recognition rate among user commands defined by a user.

6 Claims, 10 Drawing Sheets

(51) Int. Cl.
*G06F 3/16* (2006.01)
*G10L 15/02* (2006.01)
*G10L 15/10* (2006.01)
*H04N 21/422* (2011.01)
*H04N 21/439* (2011.01)
*H04N 21/482* (2011.01)
*G10L 15/187* (2013.01)
*G10L 15/08* (2006.01)

(52) U.S. Cl.
CPC ....... *G10L 15/10* (2013.01); *H04N 21/42203* (2013.01); *H04N 21/4394* (2013.01); *H04N 21/482* (2013.01); *G10L 15/187* (2013.01); *G10L 2015/0638* (2013.01); *G10L 2015/088* (2013.01); *G10L 2015/221* (2013.01); *G10L 2015/223* (2013.01); *G10L 2015/225* (2013.01)

(58) Field of Classification Search
USPC .......................................................... 704/254
See application file for complete search history.

(56) References Cited

U.S. PATENT DOCUMENTS

| | | | |
|---|---|---|---|
| 8,326,634 B2 | 12/2012 | Di Cristo | |
| 8,452,341 B2 | 5/2013 | Oh et al. | |
| 8,543,394 B2 | 9/2013 | Shin | |
| 8,599,836 B2 | 12/2013 | Van Buren | |
| 8,600,762 B2 | 12/2013 | Shin | |
| 8,949,133 B2 | 2/2015 | Homma | |
| 8,958,647 B2 | 2/2015 | Irie | |
| 8,990,347 B2 | 3/2015 | Schneider | |
| 9,218,052 B2 | 12/2015 | Chung | |
| 9,830,908 B2 * | 11/2017 | Kwon | G10L 15/22 |
| 2003/0069729 A1 | 4/2003 | Bickley et al. | |
| 2009/0306980 A1 | 12/2009 | Shin | |
| 2009/0313014 A1 | 12/2009 | Shin | |
| 2010/0273529 A1 | 10/2010 | Oh et al. | |
| 2011/0196672 A1 | 8/2011 | Ebihara et al. | |
| 2011/0288867 A1 | 11/2011 | Chengalvarayan | |
| 2012/0238329 A1 | 9/2012 | Oh et al. | |
| 2013/0243328 A1 | 9/2013 | Irie | |
| 2013/0346068 A1 | 12/2013 | Solem et al. | |
| 2014/0122085 A1 | 5/2014 | Piety et al. | |

FOREIGN PATENT DOCUMENTS

| | | |
|---|---|---|
| EP | 2613313 | 7/2013 |
| JP | 2002-297181 | 10/2002 |
| JP | 2004-029354 | 1/2004 |
| JP | 2008-040197 | 2/2008 |
| KR | 10-1999-0052629 | 7/1999 |
| KR | 10-2000-0001327 | 1/2000 |
| KR | 10-0308274 | 11/2001 |
| KR | 10-2002-0030156 | 4/2002 |
| KR | 10-2006-0070606 | 6/2006 |
| KR | 10-2006-0093208 | 8/2006 |
| KR | 10-2009-0055320 | 6/2009 |
| KR | 10-2009-0129192 | 12/2009 |
| KR | 10-2009-0130350 | 12/2009 |
| KR | 10-0952974 | 4/2010 |
| KR | 10-2010-0062251 | 6/2010 |
| KR | 10-2010-0116462 | 11/2010 |
| WO | 01/52239 | 7/2001 |

OTHER PUBLICATIONS

Extended European Search Report dated Mar. 17, 2016 in European Patent Application No. 15194814.8.
U.S. Notice of Allowance dated Jul. 17, 2017 in U.S. Appl. No. 14/921,237.
U.S. Office Action dated Apr. 12, 2017 in U.S. Appl. No. 14/921,237.
U.S. Office Action dated Nov. 16, 2016 in U.S. Appl. No. 14/921,237.
U.S. Appl. No. 14/921,237, filed Oct. 23, 2015, Nam-yeong Kwon, et al., Samsung Electronics Co., Ltd.
China Office Action dated Jul. 1, 2019 in Chinese Patent Application No. 201510810660.0.

* cited by examiner

DISPLAY APPARATUS AND METHOD FOR REGISTRATION OF USER COMMAND

CROSS-REFERENCE TO RELATED APPLICATIONS

This application is a continuation of U.S. patent application Ser. No. 14/921,237, filed on Oct. 23, 2015, which claims priority from Korean Patent Application No. 10-2014-0162654, filed on Nov. 20, 2014, in the Korean Intellectual Property Office, the disclosure of which is incorporated herein by reference in its entirety.

BACKGROUND

1. Field

The following description relates to a display apparatus and a method for registration of a user command, and more particularly, to a display apparatus and method for registration of a user command defined by a user.

2. Description of the Related Art

In accordance with the technology development, as a display apparatus such as a smartphone, a smart TV, or the like is able to recognize a voice of a user, the user may control an operation of the display apparatus or may be provided with various content services by a spoken voice without performing a separate manipulation. The above-mentioned voice recognition method is based on an embedded method of recognizing the spoken voice associated with commands which are pre-registered with the display apparatus.

However, there is a problem that the user does not accurately know the commands which are pre-registered with the display apparatus and does not effectively use a voice recognition service through the display apparatus. Therefore, in order for the user to use the display apparatus in a more fun and flexible manner while solving the above-mentioned problem, a technology for a method for registration of a user command in which the user command defined by the user is registered with the display apparatus has been developed.

However, a method for registration of a user command according to the related art focuses on a method for registration of a user command which is simply defined by the user. That is, the method for registration of the user command according to the related art does not consider a problem for misrecognition probability for the user command defined by the user, but simply focuses on the registration of the corresponding user command.

In a state in which the user command is registered through the method for registration of the user command according to the related art, in response to the spoken voice for the corresponding user command being input, a problem that the display apparatus does not accurately recognize the spoken voice of the user by surrounding environment factors may occur. Also, in a state in which other commands similar to the corresponding user command are pre-registered, in response to the spoken voice for the corresponding user command being input, a problem that the display apparatus performs a control operation which is not intended by the user, based on other commands similar to the user command by the input spoken voice, may occur.

SUMMARY

Additional aspects and/or advantages will be set forth in part in the description which follows and, in part, will be apparent from the description, or may be learned by practice of the disclosure.

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus capable of registering a user command, which is resistant to misrecognition and guarantees a high recognition rate, among user commands defined by a user.

According to an aspect of the present disclosure, a display apparatus includes an input unit configured to receive a user command; an output unit configured to output a registration suitability determination result for the user command; and a processor configured to generate phonetic symbols for the user command, analyze the generated phonetic symbols to determine registration suitability for the user command, and control the output unit to output the registration suitability determination result for the user command.

The processor may analyze at least one of a total number of generated phonetic symbols and a successive configuration of vowels and consonants in the generated phonetic symbols to determine registration suitability for the user command.

The processor may further analyze at least one of a configuration form of the generated phonetic symbols, the number of phonetic symbols for each word, and whether or not the phonetic symbols include weak phonetic symbols to determine registration suitability for the user command, and the weak phonetic symbols may include phonetic symbols for a specific pronunciation of which a frequency band or energy magnitude is decreased or lost by a surrounding environment, such that a recognition rate thereof is degraded.

The output unit may display a guide user interface (UI) guiding a registrable user command in response to it being determined that a registration of the user command is not suitable, and output an audio for the user command in response to it being determined that the registration of the user command is suitable.

The display apparatus may further include a storing unit; wherein the processor registers and stores the user command in the storing unit according to similarity between a text for the user command and a text for a spoken voice in response to the spoken voice for the user command being input in a state in which the audio for the user command is output.

The processor may determine registration suitability for the user command, and register and store the user command in the storing unit according to a selection command of a user in a case in which a registration for the user command does not belong to both of a suitable case and an unsuitable case.

The processor may measure similarity between phonetic symbols for a plurality of pre-registered commands and phonetic symbols of the user command to determine registration suitability for the user command according to the measured similarity.

The processor may determine registration suitability for the user command according to whether or not the user command corresponds to a prohibited command.

The input unit may receive one or more texts for a spoken voice from a voice recognition apparatus in response to the spoken voice for the user command being input, and the processor may determine a text selected by a user among one or more input texts as a text for the user command.

The user command may include at least one of a trigger command for entering a voice recognition mode and a control command for controlling an operation of the display apparatus.

According to an aspect of the present disclosure, a method for registration of a user command includes receiving the user command; generating phonetic symbols for the user command based on a predefined phonetic symbol set; determining registration suitability for the user command by analyzing the generated phonetic symbols; and providing a registration suitability determination result for the user command.

In the determining of registration suitability, registration suitability for the user command may be determined by analyzing at least one of a total number of generated phonetic symbols and a successive configuration of vowels and consonants in the generated phonetic symbols.

In the determining of registration suitability, registration suitability for the user command may be determined by further analyzing at least one of a configuration form of the generated phonetic symbols, the number of phonetic symbols for each word, and whether or not the phonetic symbols include weak phonetic symbols, and the weak phonetic symbols may include phonetic symbols for a specific pronunciation of which a frequency band or energy magnitude is decreased or lost by a surrounding environment, such that a recognition rate thereof is degraded.

In the providing of the registration suitability determination result for the user command, a guide user interface (UI) guiding a registrable user command may be provided in response to it being determined that a registration of the user command is not suitable, and an audio for the user command may be output in response to it being determined that the registration of the user command is suitable.

The method may further include registering the user command according to similarity between a text for the user command and a text for a spoken voice in response to the spoken voice for the user command being input in a state in which the audio for the user command is output.

In the registering of the user command, registration suitability for the user command may be determined, and the user command may be registered according to a selection command of a user in a case in which the registration for the user command does not belong to both of a suitable case and an unsuitable case.

In the determining of registration suitability for the user command, registration suitability for the user command may be determined according to similarity between phonetic symbols for a plurality of pre-registered commands and phonetic symbols of the user command.

In the determining of registration suitability for the user command, registration suitability for the user command may be determined according to whether or not the user command corresponds to a prohibited command.

In the receiving of the user command, in response to a spoken voice for the user command being input, one or more texts for the spoken voice may be input from a voice recognition apparatus, and a text selected by a user among one or more input texts may be determined as a text for the user command.

The user command may include at least one of a trigger command for entering a voice recognition mode and a control command for controlling an operation of the display apparatus.

According to an aspect of the present disclosure, there is provided a computer program stored in a recording medium coupled to a display apparatus to execute operations of: receiving a user command; generating phonetic symbols for the user command based on a predefined phonetic symbol set; determining registration suitability for the user command by analyzing the generated phonetic symbols; and providing a registration suitability determination result for the user command, wherein the computer program registers the user command.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
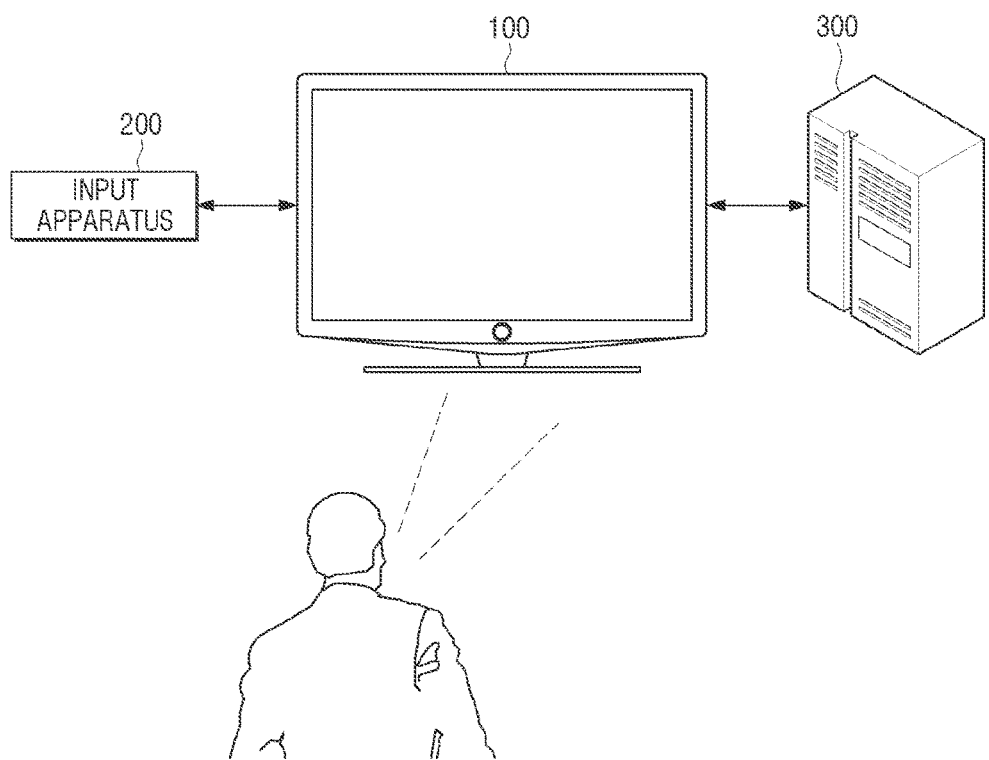
FIG. 1 is a block diagram of a voice recognition system according to an exemplary embodiment of the present disclosure.

Reference will now be made in detail to the embodiments, examples of which are illustrated in the accompanying drawings, wherein like reference numerals refer to like elements throughout. The embodiments are described below to explain the present disclosure by referring to the figures.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

FIG. 1 is a block diagram of a voice recognition system according to an exemplary embodiment of the present disclosure.

As illustrated in FIG. 1, the voice recognition system includes a display apparatus 100, an input apparatus 200, and a web server 300.

The display apparatus 100, which is an apparatus recognizing a spoken voice of a user to perform an operation intended by a user, may be implemented with various electronic apparatuses such as a smart TV, a smart phone, a tablet PC, and the like.

The input apparatus 200, which is an apparatus performing data communication with the display apparatus 100 to control an operation of the display apparatus 100, may be, for example, a remote controller, a keyboard, or the like.

Specifically, a first user may speak to operate the display apparatus 100 in a voice recognition mode. In response to a spoken voice of the user described above being input to the display apparatus 100, the display apparatus 100 analyzes a voice signal for the input spoken voice to determine whether or not the corresponding voice signal is a trigger command for entering the display apparatus 100 into the voice recognition mode. As the determination result, in response to the corresponding voice signal being the command for operating the display apparatus 100 in the voice recognition mode, the display apparatus 100 enters the voice recognition mode. As such, in a state in which the display apparatus 100 enters the voice recognition mode, in response to an additional spoken voice of the user being input to the display apparatus 100, the display apparatus 100 internally converts the additionally spoken voice into a text. However, the present disclosure is not limited thereto. For example, in the state in which the display apparatus 100 enters the voice recognition mode, in response to the spoken voice of the user being input through the input apparatus 200 or the voice recognition for the spoken voice of the user is impossible, the display apparatus 100 may receive a text for the spoken voice of the user through a voice recognition apparatus 300.

Here, the voice recognition apparatus 300 may be an apparatus performing the data communication with the display apparatus 100 to perform the voice recognition for the spoken voice of the user from the display apparatus 100 and transmitting a recognized voice recognition result to the display apparatus 100.

Thereafter, the display apparatus 100 may control the operation of the display apparatus 100 based on the text for the spoken voice of the user or receive and display response information corresponding to the spoken voice of the user from the web server (not illustrated).

Here, the web server (not illustrated) is a server providing content related information. For example, if the speaking "please retrieve ooo" is input from the user, a communication unit 160 may receive retrieved results associated with "ooo" from the web server (not illustrated).

Meanwhile, an execution command controlling the operation of the display apparatus 100 with regard to the spoken voice of the user may be registered and set by the user. Hereinafter, an execution command intended to be registered and set by the user is referred to as a user command. Specifically, the user may input the user command intended to be registered and set by himself or herself through the input apparatus 200. If the user command described above is input to the display apparatus 100, the input apparatus 200 transmits user command registration request information including a user command of a text type to the display apparatus 100. However, the present disclosure is not limited thereto. For example, in a state in which the display apparatus 100 is set in a user command registration mode, the display apparatus 100 may receive the spoken voice for the user command through a microphone. In response to the spoken voice for the user command as described above being input to the display apparatus 100, the display apparatus 100 may transmit the input spoken voice to the voice recognition apparatus 300 and may receive a user command converted into the text type from the voice recognition apparatus 300.

In response to the user command of the text type as described above being received from the input apparatus 200 or the voice recognition apparatus 300, the display apparatus 100 generates phonetic symbols for the user command of the text type. Thereafter, the display apparatus 100 analyzes the phonetic symbols for the user command by a predetermined suitability determination condition to determine registration suitability of the user command requested by the user. Here, the suitability determination condition may be at least one of a total number of phonetic symbols, whether or not vowels and consonants of the phonetic symbols are successive, a configuration form of the phonetic symbols, the number of phonetic symbols for each word, and whether or not predefined weak phonetic symbols are included.

Therefore, the display apparatus 100 analyzes the phonetic symbols for the user command by the suitability determination condition as described above to determine registration suitability of the user command and outputs the determination result to at least one of a user interface (UI) and an audio device. In a case in which it is determined that the registration of the user command is unsuitable, the user may re-input a registrable user command, and the display apparatus 100 may re-perform the above-mentioned operations to re-perform a registration suitability determination for the re-input user command. Meanwhile, in a case in which it is determined that the registration of the user command is suitable, the display apparatus 100 registers the user command according to a registration request for the corresponding user command. Therefore, the user may control the operation of the display apparatus 100 using the user command set by himself or herself.

Hereinabove, the respective configurations of the voice recognition system according to the present disclosure have been schematically described. Hereinafter, the respective configurations of the display apparatus 100 described above will be described in detail.

Figure 2:
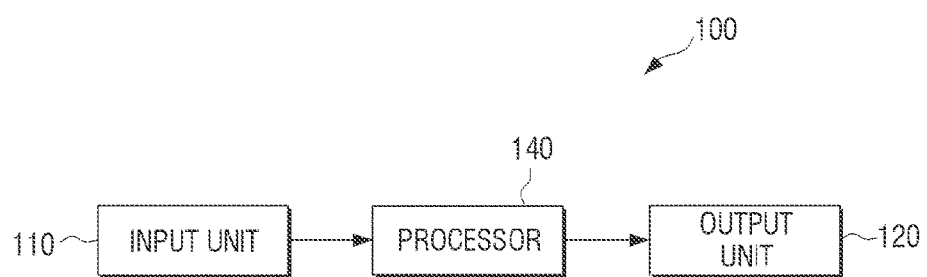
FIG. 2 is a block diagram of a display apparatus according to an exemplary embodiment of the present disclosure.
Figure 3:
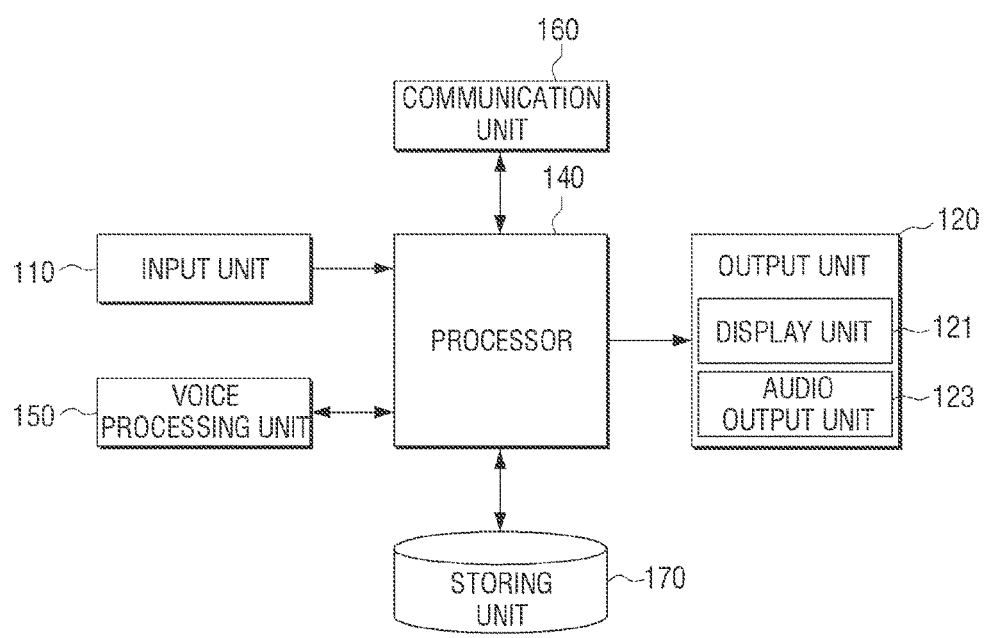
FIG. 3 is a detailed block diagram of the display apparatus according to the exemplary embodiment of the present disclosure.

FIG. 2 is a block diagram of the display apparatus according to an exemplary embodiment of the present disclosure and FIG. 3 is a detailed block diagram of the display apparatus according to the exemplary embodiment of the present disclosure.

As illustrated in FIG. 2, the display apparatus 100 includes an input unit 110, an output unit 120, and a processor 140. Additionally, the display apparatus 100 may further include a voice processing unit 150, a communication unit 160, and a storing unit 170 as illustrated in FIG. 3, in addition to the configuration of the input unit 110, the output unit 120, and the processor 140.

The input unit 110, which is an input for receiving various user manipulations and transferring various user manipulations to the processor 140, may be implemented as an input panel. Here, the input panel may be formed in a touch pad, or a key pad or touch screen type including a variety of function keys, number keys, special keys, letter keys, and the like. As well, the input unit 170 may receive a control command transmitted from a remote control apparatus 200 such as a remote controller or a keyboard for controlling the operation of the display apparatus 100. As well, the input unit 110 may receive the spoken voice of the user through a microphone (not illustrated). The input unit 110 as described above may receive a user command of a text type from the remote control apparatus 200 or may receive the spoken voice for the user command through the microphone (not illustrated). Here, the user command, which is an execution command defined by the user to control the operation of the display apparatus 100, may be at least one of a trigger command for entering the display apparatus 100 into the voice recognition mode and a control command for controlling the operation of the display apparatus 100.

The output unit 120 outputs the registration suitability determination result for the user command input through the input unit 110. The output unit 120 as described above may include a display unit 121 and an audio output unit 123 as illustrated in FIG. 3. Therefore, the output unit 120 may output the registration suitability determination result for the user command through at least one of the display unit 121 and the audio output unit 123.

Meanwhile, the processor 140, which is a configuration generally taking charge of the control of the apparatus, may be used interchangeably with a central processing unit, a microprocessor, a controlling unit, and the like. In addition, the processor 140, which is to control a general operation of the apparatus, may be implemented as system-on-a-chip (SOC) or system on chip (SoC) with other function units.

Such processor 140 generally controls operations of all of configurations constituting the display apparatus 100. Particularly, the processor 140 may copy a phonetic symbol generation related program pre-stored in the storing unit 170 in a random access memory (RAM) according to the user command for a user command registration and may generate phonetic symbols for the user command of the text type using the phonetic symbol generation related program copied in the RAM.

More specifically, the processor 140 may generate the phonetic symbols for the user command of the text type based on a predefined phonetic symbol set. Here, the predefined phonetic symbol set may include at least one of vowels, diphthongs, consonants, affricates, accents, and symbols. If such phonetic symbols for the user command are generated, the processor 140 analyzes a pre-generated phonetic symbol based on a predetermined suitability determination condition to determine registration suitability for the user command. Thereafter, the processor 140 controls the output unit 120 to output the registration suitability determination result for the user command.

Specifically, if the registration request information for the user command defined by the user is input through the input unit 110, the processor 140 enters a registration performing mode for the user command. Here, the registration request information may be request information for registering the user command associated with the trigger command for entering the voice recognition mode or request information for registering the user command associated with the control command for controlling the operation of the display apparatus 100. In response to the user command corresponding to the registration request of the user being input through the input unit 110 after such registration request information is input, the processor 140 generates the input user command in a phonetic symbol form. According to an exemplary embodiment, in response to the spoken voice associated with the user command output from a microphone (not illustrated) being input through the input unit 110, the processor 140 performs a control so that the voice processing unit 150 performs a voice recognition for the spoken voice of the user. According to such control command, the voice processing unit 150 may convert the spoken voice of the user into the text using a speech to text (STT) algorithm.

According to an exemplary embodiment, in response to the spoken voice associated with the user command output from a microphone (not illustrated) being input through the input unit 110, the processor 140 transmits the spoken voice associated with the user command to the voice recognition apparatus 300. Thus, the voice recognition apparatus 300 performs the voice recognition for the received spoken voice and transmits the voice recognition result of the text type to the display apparatus 100. In this case, the voice recognition apparatus 300 may transmit at least one voice recognition result of the text type with regard to the spoken voice of the user to the display apparatus 100. Therefore, in a case in which a plurality of texts for the spoken voice of the user are received from the voice recognition apparatus 300, the processor 140 controls the output unit 120 to display a list for the plurality of texts. Thus, the output unit 120 displays the list for the plurality of texts through the display unit 121. In a state in which such list is displayed, in response to a selection command for one text being input, the processor 140 may determine a text corresponding to the input selection command as a text for the spoken voice of the user.

According to an exemplary embodiment, the processor 140 may determine the subject to perform the voice recognition for the spoken voice of the user depending on whether data communication with the voice recognition apparatus 300 may be performed through the communication unit 160. That is, if the data communication with the voice recognition apparatus 300 may be performed, the processor 140 may receive the voice recognition result for the spoken voice of the user from the voice recognition apparatus 300, and if the data communication with the voice recognition apparatus 300 may not be performed, the processor 140 may perform the voice recognition for the spoken voice of the user by the voice processing unit 150.

Here, the communication unit 160 performs the data communication with the voice recognition apparatus 300 and receives the voice recognition result for the spoken voice of the user from the voice recognition apparatus 300. As well, the communication unit 160 may perform the data communication with the input apparatus 200 and may receive at least one of the user command for controlling the operation of the display apparatus 100 and the spoken voice of the user. Additionally, the communication unit 160 may perform the data communication with a web server (not illustrated) and may receive the response information corresponding to the spoken voice of the user.

Such communication unit 160 may include various communication modules such as a local area wireless communication module (not illustrated), a wireless communication module (not illustrated), and the like. Here, the local area wireless communication module (not illustrated), which is a communication module performing wireless communication with at least one of the input apparatus 200 and the web server (not illustrated) located at a local area, may be, for example, Bluetooth, Zigbee, or the like. The wireless communication module (not illustrated) is a module connected to an external network according to a wireless communication protocol such as WFi, IEEE, or the like, to perform communication. The wireless communication module may further include a mobile communication module connected to a mobile communication network according to various mobile communication standards such as 3rd generation (3G), 3rd generation partnership project (3GPP), Long Term Evolution (LTE), and the like to perform communication.

Meanwhile, if the spoken voice associated with the user command is converted into the text type or is received from the voice recognition apparatus 300 according to various exemplary embodiments described above, the processor 140 generates the phonetic symbols for the user command of the text type based on the predefined phonetic symbol set. For example, in response to a user command of a text type called "kangazi" being input, the processor 140 may generate phonetic symbols [k:ang_a:_zi] from the user command of the text called "kangazi".

Figure 4:
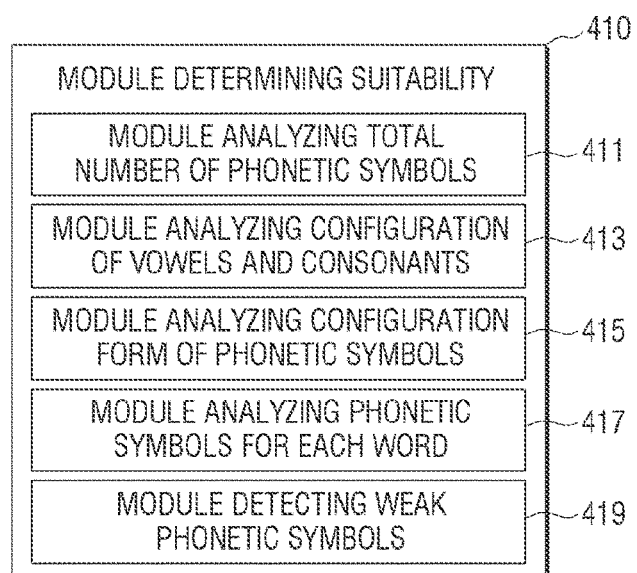
FIG. 4 is a view illustrating a module determining suitability according to an exemplary embodiment of the present disclosure.

If such phonetic symbols are generated, the processor 140 analyzes the generated phonetic symbols based on the predetermined suitability determination condition to determine registration suitability for the user command. As the determination result, if it is determined that the registration of the user command is suitable, the processor 140 registers and stores the user command defined by the user in the storing unit 170. Thereafter, in response to the speaking for the user command registered and stored in the storing unit 170 being input, the processor 140 may control the operation of the display apparatus 100 based on the user command associated with the input speaking. FIG. 4 is a view illustrating a module determining suitability according to an exemplary embodiment of the present disclosure.

As illustrated in FIG. 4, the module 410 determining registration suitability may include at least one of a module 411 analyzing a total number of phonetic symbols, a module 413 analyzing a configuration of vowels and consonants configuring the phonetic symbols, a module 415 analyzing a configuration form of the phonetic symbols, a module 417 analyzing the phonetic symbols for each word configuring the user command, and a module 419 detecting weak phonetic symbols.

Here, the module analyzing the total number of phonetic symbols (hereinafter, referred to as a first condition) is a module determining whether or not the total number of phonetic symbols for the user command includes a predetermined number or more. In addition, the module analyzing the configuration of the vowels and consonants configuring the phonetic symbols (hereinafter, referred to as a second condition) is a module determining whether or not the vowels or the consonants are successively overlapped on the phonetic symbols for the user command. In addition, the module analyzing the configuration form of the phonetic symbols (hereinafter, referred to as a third condition) is a module detecting whether the configuration of the phonetic symbols for the user command is listed in which form based on the predefined phonetic symbol set. In addition, the module analyzing the phonetic symbols for each word (hereinafter, referred to as a fourth condition) is a module determining whether or not the number of respective words configuring the user command and the number of phonetic symbols corresponding to each word are the predetermined number or more, or are less than the predetermined number. In addition, the module detecting the weak phonetic symbols (hereinafter, referred to as a fifth condition) is a module determining whether or not phonetic symbols of a beginning and an end among the phonetic symbols configuring the user command are predefined weak phonetic symbols. Here, the predefined weak phonetic symbols may be phonetic symbols for a specific pronunciation of which a frequency band or energy magnitude is decreased or lost by a surrounding environment such as living noise, or the like, such that a recognition rate thereof is degraded.

Therefore, the processor 140 may analyze the phonetic symbols for the user command using at least one of the first to fifth conditions included in the module determining registration suitability to determine registration suitability for the user command.

According to an exemplary embodiment, the processor 140 may analyze the phonetic symbols generated from the user command using the modules corresponding to the first and second conditions among the modules included in the module determining registration suitability to determine registration suitability for the user command.

For example, if the user command of the text type called "kangazi" is input, the processor 140 may generate phonetic symbols [k:ang_a:_zi] from the user command of the text type called "kangazi". If such phonetic symbols are generated, the processor 140 determines whether or not the total number of phonetic symbols [k:ang_a:_zi] is the predetermined number or more using a module corresponding to the first condition among the modules included in the module determining registration suitability. For example, if the predetermined number matching the first condition is five and the total number of phonetic symbols [k:ang_a:_zi] is seven, the processor 140 determines that the total number of phonetic symbols is the predetermined number or more and determines that the user command is matched to the first condition.

If the user command is matched to such first condition, the processor 140 determines whether or not at least one of the vowels and the consonants on the phonetic symbols [k:ang_a:_zi] is configured in a successive form using a module corresponding to the second condition among the modules included in the module determining registration suitability. As the determination result, if at least one of the vowels and consonants is not configured in the successive form, the processor 140 determines that the user command is matched to the second condition. As such, if the user command is matched to the first and second conditions, the processor 140 may determine that the registration for the user command "kangazi" is suitable.

As another example, if a user command of a text type called "a a a a a" is input, the processor 140 may generate phonetic symbols [a_a_a_a_a] from the user command of the text type called "a a a a a". In this case, the processor 140 determines that vowels of the phonetic symbols [a_a_a_a_a] are successive. As such, if the user command is not matched to at least one of the first and second conditions, the processor 140 may determine that the registration for the user command "a a a a a" is not suitable. That is, the user command having successive vowels has a problem that the spoken voice of the user spoken with regard to the registered user command may be recognized to be different from the corresponding user command. Therefore, as in the example described above, the processor 140 may determine that the user command having the successive vowels is not suitable as the user command. According to an exemplary embodiment, the processor 140 may determine the registration suitability for the user command using the modules corresponding to the first and second conditions and the modules corresponding to at least one of the third to fifth conditions among the modules included in the module determining registration suitability.

For example, if phonetic symbols [skaip_TV] are generated from a user command of a text type "skype TV", the processor 140 analyzes the phonetic symbols [skaip_TV] using the modules corresponding to the first and second conditions among the modules included in the module determining registration suitability to determine registration suitability for the corresponding user command. As the determination result, if the total number of phonetic symbols [skaip_TV] is the predetermined number or more and at least one of the vowels and consonants is not successive, the processor 140 determines that the user command "skype TV" is matched to the first and second conditions. As such, if the user command is matched to the first and second conditions, the processor 140 analyzes the phonetic symbols [skaip_TV] using the module corresponding to at least one of the third to fifth conditions among the modules included in the module determining registration suitability to determine registration suitability for the corresponding user command.

Specifically, the processor 140 analyzes a configuration form of the phonetic symbols [skaip_TV] by the module corresponding to the third condition to determine whether or not components configuring the corresponding phonetic symbols are distributed in the order corresponding to a predefined pattern.

For example, a first pattern which is predefined may be defined in the order of a consonant, a consonant, a vowel, a vowel, a consonant, a consonant, and the like, a second pattern may be defined in the order of a vowel, a consonant, a symbol, an affricate, a vowel, a consonant, and the like, and a third pattern may be defined in the order of a consonant, a vowel, a consonant, a vowel, a consonant, a vowel, a consonant, the like.

In this case, the processor 140 may determine that the components configuring the phonetic symbols [skaip_TV] are listed based on the first pattern among the first to third patterns.

Meanwhile, as in the example described above, the phonetic symbols [k:ang_a:_zi] may be generated from the user command of the text type "kangazi" In this case, the processor 140 may determine that the components configuring the phonetic symbols [k:ang_a:_zi] are listed based on the third pattern among the first to third patterns. As such, if it is determined that the components configuring the phonetic symbols generated from the user command of the text type are listed based on the predefined pattern, the processor 140 determines that the user command is matched to the third condition.

If the user command is matched to the third condition, the processor 140 determines whether or not the number of words configuring the user command and the number of phonetic symbols for each word are the predetermined number or more, or are less than the predetermined number by the module corresponding to the fourth condition.

As in the example described above, the phonetic symbols [skaip_TV] generated with regard to the user command "skype TV" may be matched to the third condition. In this case, the processor 140 determines whether or not the number of words configuring the user command and the number of phonetic symbols for each word among the phonetic symbols [skaip_TV] are the predetermined number or more, or are less than the predetermined number by the module corresponding to the fourth condition.

For example, the user command which is suitable for registration may be combined of two or more words, and the phonetic symbols for each word may be predetermined to be two or more. Meanwhile, the user command "skype TV" may be configured of two words "skype" and "TV", and the phonetic symbols for each of "skype" and "TV" may be [skaip] and [TV]. In this case, the user command "skype TV" may be configured of the two words and the number of phonetic symbols of each word may be two or more. As such, if the number of words configuring the user command "skype TV" and the number of phonetic symbols for each word are the predetermined number or more or are less than the predetermined number, the processor 140 may determine that the user command "skype TV" is matched to the fourth condition.

If the user command is matched to the fourth condition, the processor 140 determines whether or not phonetic symbols of a beginning and an end of the phonetic symbols for each word configuring the user command include the predefined weak phonetic symbols by the module corresponding to the fifth condition. Here, the predefined weak phonetic symbol may be a phonetic symbol for a specific pronunciation of which a frequency band or energy magnitude is decreased or lost by a surrounding environment such as living noise, or the like, such that a recognition rate thereof is degraded. In general, in a case in which a pronunciation begins or ends with phonetic symbols such as [s], [p], [f], and [k], the pronunciation associated with the corresponding phonetic symbols has a frequency band or energy magnitude which is decreased or lost by a surrounding environment, such that a recognition rate thereof may be degraded.

Therefore, the processor 140 analyzes the phonetic symbols for each word for each of "skype" and "TV" configuring the user command "skype TV" to determine whether or not the beginning or the end of the phonetic symbols includes the predefined weak phonetic symbol. As described above, the phonetic symbols of a word "skype" may be "[skaip]", and the beginning and the end of the above-mentioned phonetic symbols may include [s] and [p]. Therefore, the processor 140 may determine that the user command "skype TV" is not matched to the fifth condition.

As such, if the user command which is determined that the registration thereof is suitable by the modules corresponding to the first and second conditions is determined that the registration thereof is not suitable by the module corresponding to at least one of the third to fifth conditions, the processor 140 may finally determine that the registration of the corresponding user command is not suitable.

According to an exemplary embodiment, the processor 140 may determine registration suitability for the user command for the respective modules corresponding to the first to fifth conditions included in the module determining registration suitability and may finally determine registration suitability for the user command based on a result value according to the determination result.

As described above, the processor 140 determines registration suitability for the user command for the respective modules corresponding to the first to fifth conditions included in the module determining registration suitability. Thereafter, the processor 140 may calculate a result value for the user command based on the registration suitability determination result for each module and may finally determine registration suitability for the user command based on the calculated result value.

According to the exemplary embodiment, the processor 140 determines registration suitability for the user command for the respective modules corresponding to the first to fifth conditions included in the module determining registration suitability. If it is determined that the registration with regard to at least one condition of the first to fifth conditions is not suitable, the processor 140 may sum predetermined reference values for the respective modules corresponding to other conditions except for the condition in which the registration is not suitable, among the first to fifth conditions to calculate the result value for the user command.

Here, the reference values set for the respective modules corresponding to the first to fifth conditions may be set to be equal to each other or to be different from each other. In a case in which different reference values are set for the respective modules corresponding to the first to fifth conditions, a reference value of a module corresponding to the highest priority in a registration suitability determination reference among the modules corresponding to the first to fifth conditions may be set to be highest and a reference value of a module corresponding to the lowest priority may be set to be lowest. If the result value corresponding to an analysis result of the user command is calculated through the exemplary embodiment described above, the processor 140 may finally determine registration suitability for the user command based on the calculated result value.

Figure 5:
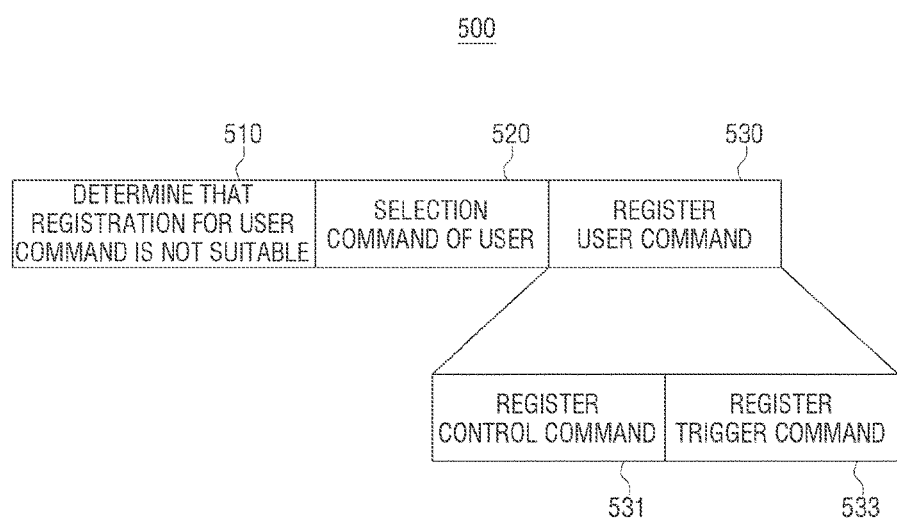
FIG. 5 is a illustrative view determining registration suitability for a user command based on a result value calculated by a module determining registration suitability in the display apparatus according to the exemplary embodiment of the present disclosure.

FIG. 5 is an illustrative view determining registration suitability for the user command based on the result value calculated by the module determining registration suitability in the display apparatus according to the exemplary embodiment of the present disclosure.

The processor 140 may determine registration suitability for the user command for the respective modules corresponding to the first to fifth conditions included in the module determining registration suitability and may calculate the result value for the user command based on the registration suitability determination result for each module.

If the result value for the user command is calculated, the processor 140 may determine registration suitability for the user command depending on sections to which the calculated result value belongs, with reference to a registration determination reference model 500 illustrated in FIG. 5.

Specifically, if the result value corresponding to the analysis result of the user command belongs to a first threshold section 510, the processor 140 determines that the registration for the user command is not suitable. Meanwhile, if the result value corresponding to the analysis result of the user command belongs to a second threshold section 530, the processor 140 determines that the registration for the user command is suitable. Meanwhile, if the result value corresponding to the analysis result of the user command belongs to a third threshold section 520 between the first and second threshold sections, the processor 140 may determine that the registration for the user command is suitable according to a selection command of the user for the user command.

Meanwhile, if the result value corresponding to the analysis result of the user command belongs to the second threshold section 530, the processor 140 may determine whether or not the registration for the user command is suitable as the control command or is suitable as the trigger command according to the registration request information of the user.

Specifically, in a state in which the registration request information for controlling the operation of the display apparatus 100 is input, the result value corresponding to the analysis result of the user command may belong to a 2-1-th threshold section 531 of the second threshold section 530. In this case, the processor 140 may determine that the registration for the user command is suitable as the control command for controlling the operation of the display apparatus 100.

Meanwhile, in a state in which the registration request information for operating the display apparatus 100 in the voice recognition mode is input, the result value corresponding to the analysis result of the user command may belong to a 2-2-th threshold section 533 of the second threshold section 530. In this case, the processor 140 may determine that the registration for the user command is suitable as the trigger command for operating the display apparatus 100 in the voice recognition mode.

Meanwhile, in the state in which the registration request information for operating the display apparatus 100 in the voice recognition mode is input, if the result value corresponding to the analysis result of the user command belongs to a 2-1-th threshold section 531 of the second threshold section 530, the processor 140 may determine that the registration for the user command is suitable as the trigger command for operating the display apparatus 100 in the voice recognition mode according to the selection command of the user for the user command.

Meanwhile, according to an aspect of the present disclosure, after the processor 140 determines similarity between the spoken voice of the user and a plurality of commands which are pre-registered or whether or not the spoken voice of the user corresponds to a prohibited command, the processor 140 may determine registration suitability for the user command according to various exemplary embodiments described above.

According to an exemplary embodiment, the processor 140 measures similarity between the phonetic symbols generated from the user command and pre-stored phonetic symbols for a plurality of commands using a similarity algorithm such as a confusion matrix to calculate reliability values accordingly. Thereafter, the processor 140 compares the respective calculated reliability values with a predetermined threshold value to determine whether or not the respective reliability values are less than the predetermined threshold value. As the determination result, if at least one reliability value is the predetermined threshold value or more, the processor 140 determines that the user command and at least one pre-registered command are similar to each other and determines that the registration for the user command is not suitable. Meanwhile, if all of the reliability values are less than the predetermined threshold value, the processor 140 determines that the registration for the user command is suitable.

According to an exemplary embodiment, the processor 140 determines whether or not the user command is an unregistrable command with reference to the prohibited commands which are registered and stored in the storing unit 170. As the determination result, if the user command is associated with at least one prohibited command, the processor 140 determines that the registration for the user command is not suitable. Meanwhile, if the user command is not associated with at least one prohibited command, the processor 140 determines that the registration for the user command is suitable.

In this case, the processor 140 may perform at least one of a first determination operation of determining whether or not the user command is similar to the pre-registered command and a second determination operation of determining whether or not the corresponding user command is the prohibited command, as described above.

If the registration suitability for the user command is primarily determined by at least one of the first determination operation and the second determination operation described above, the processor 140 determines registration suitability for the user command according to various exemplary embodiments described above. If it is determined that the registration of the user command is suitable, the processor 140 may provide the registration suitability determination result of the user command through the output unit 120. Specifically, if it is determined that the registration for the user command is suitable, the audio output unit 123 outputs an audio for the user command according to a control command of the processor 140. In a state in which the above-mentioned audio is output, if the spoken voice of the user is input within the predetermined threshold time, the processor 140 registers and stores the user command in the storing unit 170 according to a degree of similarity between the text for the user command and the text for the spoken voice of the user. Specifically, if the spoken voice is input after the audio for the user command is output, the processor 140 may convert the input spoken voice into the text type or receive the voice recognition result converted into the text type from the voice recognition apparatus 300. Thereafter, the processor 140 measures similarity between the phonetic symbols for the user command and the phonetic symbols for the spoken voice using the similarity algorithm such as the confusion matrix, and resisters and stores the user command in the storing unit 170 if the similarity value according to the measurement is the predetermined threshold value or more.

Meanwhile, if it is determined that the registration for the user command is not suitable, the display unit 121 displays an analysis result analyzed according to the predetermined suitability determination conditions and a guide UI guiding a registrable user command, according to the control command of the processor 140. Accordingly, the user may re-input a user command matched to the registration determination condition with reference to the guide UI displayed on a screen of the display apparatus 100.

Hereinafter, in a case in which the registration for the user command is not suitable in the display apparatus 100, an operation of providing a determination result according to the above-mentioned unsuitable registration will be described in detail with reference to FIGS. 6 to 8.

Figure 6:
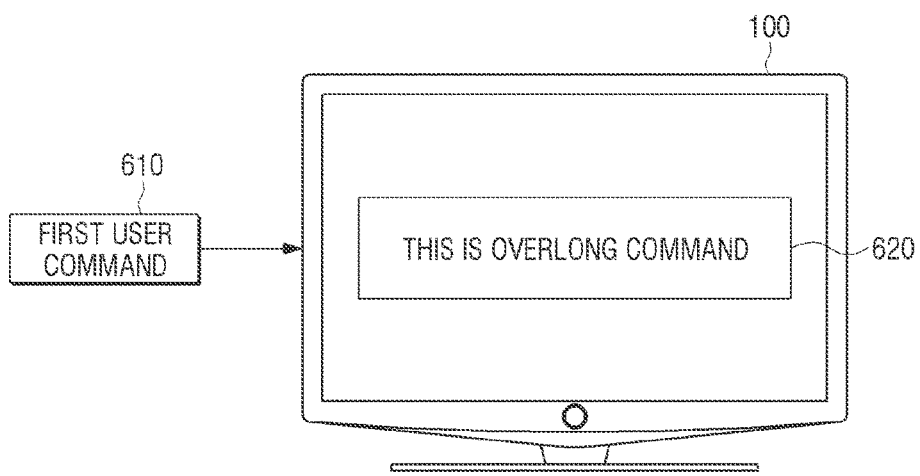
FIG. 6 is a first illustrative view providing a registration unsuitability determination result for the user command in the display apparatus according to the exemplary embodiment of the present disclosure.

FIG. 6 is a first illustrative view providing a registration unsuitability determination result for the user command in the display apparatus according to the exemplary embodiment of the present disclosure.

As illustrated in FIG. 6, a first user command 610 defined by the user may be determined that a registration thereof is not suitable, by the module corresponding to the fourth condition among the modules included in the module determining registration suitability described above. As described above, the module corresponding to the fourth condition is the module determining whether or not the number of respective words configuring the user command and the number of phonetic symbols corresponding to each word are the predetermined number or more, or are less than the predetermined number.

Therefore, if the number of respective words configuring the first user command 610 exceeds the predetermined number, the processor 140 may determine that the registration for the first user command 610 is not suitable. As such, if it is determined that the registration for the first user command 610 is not suitable, the display apparatus 100 may display a guide UI 620 "this is an overlong command" on the screen thereof through the display unit 121.

Therefore, the user may re-input a user command consisting of words smaller than the first user command 610 with reference to the guide UI 620 displayed on the screen.

Figure 7:
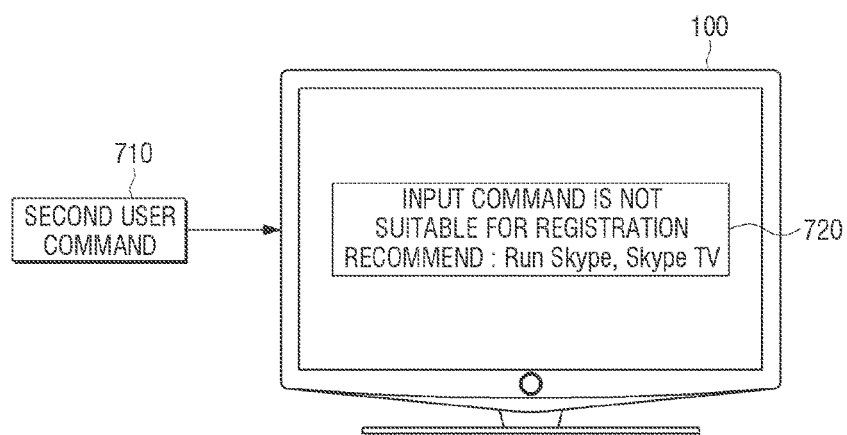
FIG. 7 is a second illustrative view providing a registration unsuitability determination result for a user command in a display apparatus according to an exemplary embodiment of the present disclosure.

FIG. 7 is a second illustrative view providing the registration unsuitability determination result for the user command in the display apparatus according to an exemplary embodiment of the present disclosure.

As illustrated in FIG. 7, a second user command 710 defined by the user may be determined that a registration thereof is not suitable, by the module corresponding to the fourth condition among the modules included in the module determining registration suitability described above. As described above, the module corresponding to the fourth condition is the module determining whether or not the number of respective words configuring the user command and the number of phonetic symbols corresponding to each word are the predetermined number or more, or are less than the predetermined number.

Therefore, if the number of respective words configuring the second user command 710 is less than the predetermined number, the processor 140 may determine that the registration for the second user command 710 is not suitable. As such, if it is determined that the registration for the second user command 710 is not suitable, the display apparatus 100 may display a guide UI 720 including determination result information "an input command is not suitable for registration" and recommend information for the user command such as "Recommend: Run Skype, Skype TV" on the screen thereof through the display unit 121.

Therefore, the user may re-input a user command that he or she desires with reference to the user command recommended with regard to the second user command 710 through the guide UI 720 displayed on the screen.

Figure 8:
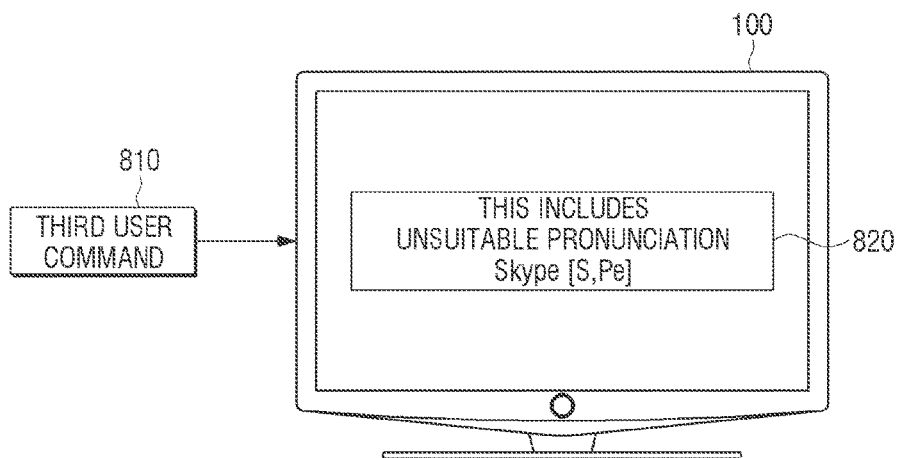
FIG. 8 is a third illustrative view providing the registration unsuitability determination result for the user command in the display apparatus according to an exemplary embodiment of the present disclosure.

FIG. 8 is a third illustrative view providing the registration unsuitability determination result for the user command in the display apparatus according to an exemplary embodiment of the present disclosure.

As illustrated in FIG. 8, a third user command 810 defined by the user may be determined that a registration thereof is not suitable, by the module corresponding to the fifth condition among the modules included in the module determining registration suitability described above. As described above, the module corresponding to the fifth condition is the module determining whether or not the phonetic symbols of the beginning and the end among the phonetic symbols configuring the user command are the predefined weak phonetic symbols.

Therefore, if the phonetic symbol of at least one of the beginning and the end on the phonetic symbols for the respective words configuring a third user command 810 is the weak phonetic symbol, the processor 140 may determine that the registration for the third user command 810 is not suitable. As such, if it is determined that the registration for the third user command 810 is not suitable, the display apparatus 100 may display a guide UI 820 including determination result information "this includes an unsuitable pronunciation" and weak pronunciation information guiding the unsuitable pronunciation such as "Skype [S,Pe]" on the screen thereof through the display unit 121.

Therefore, the user may re-input a user command excluding the unsuitable weak pronunciation with reference to the guide UI 820 displayed on the screen.

Hereinabove, the operations of registering the user commands defined by the user in the display apparatus 100 according to the present disclosure have been described in detail. Hereinafter, a method for registration of a user command defined by the user in the display apparatus 100 according to the present disclosure will be described in detail.

Figure 9:
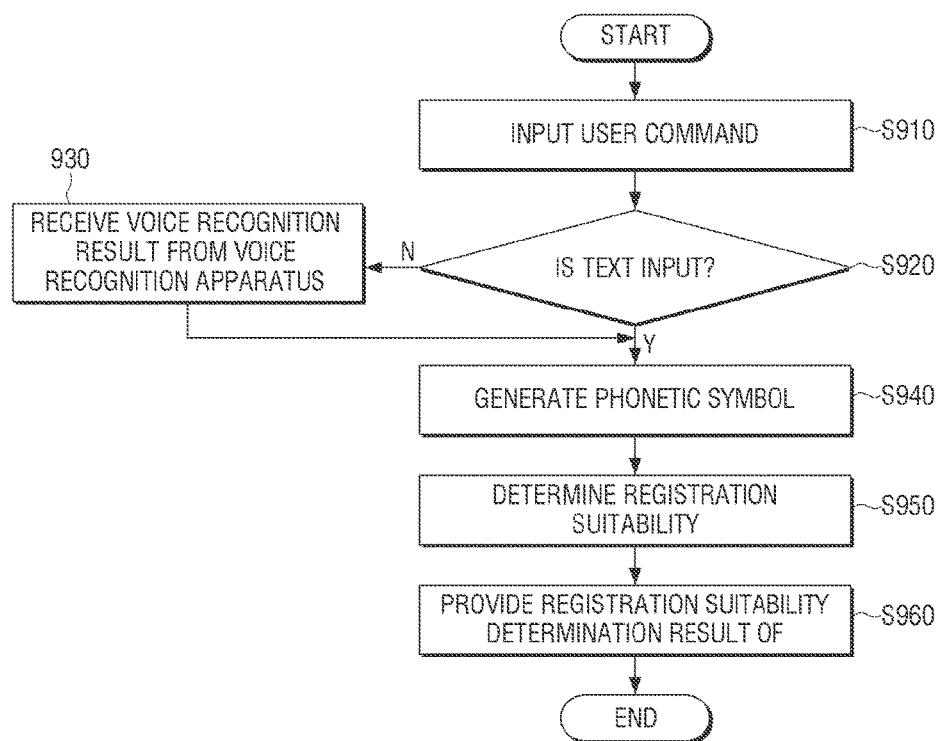
FIG. 9 is a flow chart of a method for determining registration suitability for a user command in a display apparatus according to an exemplary embodiment of the present disclosure.

FIG. 9 is a flow chart of a method for determining registration suitability for the user command in the display apparatus according to an exemplary embodiment of the present disclosure.

As illustrated in FIG. 9, if the user command defined by the user is input, the display apparatus 100 determines whether the input user command is a command of a text type or a spoken voice (operation S910 and operation S920).

Specifically, if the registration request information for the user command defined by the user is input, the display apparatus 100 enters a registration performing mode for the user command. Here, the registration request information may be request information for registering the user command associated with the trigger command for entering the voice recognition mode or request information for registering the user command associated with the control command for controlling the operation of the display apparatus 100.

In a state in which such registration request information is input, the display apparatus 100 determines whether or not a user command corresponding to the registration request of the user is input from the input apparatus 200. As the determination result, if the spoken voice for the user command is input through the input apparatus 200 such as a microphone (not illustrated) or a remote controller, the display apparatus 100 receives the voice recognition result for the spoken voice converted into the text from the voice recognition apparatus 300 (operation S930). However, the present disclosure is not limited thereto. If the data communication with the voice recognition apparatus 300 is not performed or the spoken voice for the user command is input through the microphone, the display apparatus 100 may convert the spoken voice of the user into the text using the speech to text (STT) algorithm. Meanwhile, the voice recognition apparatus 300 transmitting the voice recognition result for the spoken voice associated with the user command to the display apparatus 100 may transmit at least one voice recognition result of the text type with regard to the spoken voice of the user to the display apparatus 100. Therefore, in a case in which a plurality of texts for the spoken voice of the user are received from the voice recognition apparatus 300, the display apparatus 100 displays a list for the plurality of texts. Thereafter, if a selection command for one text is input, the display apparatus 100 may determine a text corresponding to the input selection command as a text for the spoken voice of the user.

If the user command of the text type is input according to various exemplary embodiments described above, the display apparatus 100 generates phonetic symbols for the user command of the text type based on the predefined phonetic symbol set (operation S940). Thereafter, the display apparatus 100 analyzes the generated phonetic symbols based on the predetermined suitability determination condition to determine registration suitability for the user command (operation S950). Thereafter, the display apparatus 100 provides the registration suitability determination result for the user command (operation S960).

Specifically, the display apparatus 100 analyzes the pre-generated phonetic symbols with regard to the user command according to the predetermined registration suitability determination module with regard to the suitability determination condition to determine registration suitability for the user command. Here, the module determining registration suitability may include at least one of the module analyzing a total number of phonetic symbols (first condition), the module analyzing a configuration of vowels and consonants configuring the phonetic symbols (second condition), the module analyzing a configuration form of the phonetic symbols (third condition), the module analyzing the phonetic symbols for each word configuring the user command (fourth condition), and the module detecting weak phonetic symbols (fifth condition), as described in FIG. 4. Since the respective modules have been described in detail with reference to FIG. 4, a detail description thereof will be omitted.

According to an exemplary embodiment, the display apparatus 100 may analyze the phonetic symbols generated from the user command using the modules corresponding to the first and second conditions among the modules included in the module determining registration suitability to determine registration suitability for the user command.

According to an exemplary embodiment, the display apparatus 100 may determine registration suitability for the user command using the modules corresponding to the first and second conditions and the module corresponding to at least one of the third to fifth conditions among the modules included in the module determining registration suitability.

According to an exemplary embodiment, the display apparatus 100 may determine registration suitability for the user command for the respective modules corresponding to the first to fifth conditions included in the module determining registration suitability and may finally determine registration suitability for the user command based on a result value according to the determination result.

Specifically, the display apparatus 100 determines registration suitability for the user command for the respective modules corresponding to the first to fifth conditions included in the module determining registration suitability. If it is determined that the registration with regard to at least one condition of the first to fifth conditions is not suitable, the display apparatus 100 may sum predetermined reference values for respective modules corresponding to other conditions except for the condition in which the registration is not suitable, among the first to fifth conditions to calculate the result value for the user command.

Here, the reference values set for the respective modules corresponding to the first to fifth conditions may be set to be equal to each other or to be different from each other. In a case in which different reference values are set for the respective modules corresponding to the first to fifth conditions, a reference value of a module corresponding to the highest priority in a registration suitability determination reference among the modules corresponding to the first to fifth conditions may be set to be highest and a reference value of a module corresponding to the lowest priority may be set to be lowest.

Therefore, if the result value for the user command is calculated by the module determining suitability described above, the display apparatus 100 may determine registration suitability for the user command depending on sections to which the calculated result value belongs, with reference to a registration determination reference model. Specifically, as described in FIG. 5, if the result value corresponding to the analysis result of the user command belongs to the first threshold section 510, the display apparatus 100 determines that the registration for the user command is not suitable. Meanwhile, if the result value corresponding to the analysis result of the user command belongs to the second threshold section 530, the display apparatus 100 determines that the registration for the user command is suitable. Meanwhile, if the result value corresponding to the analysis result of the user command belongs to the third threshold section 520 between the first and second threshold sections, the display apparatus 100 may determine that the registration for the user command is suitable according to the selection command of the user for the user command.

Meanwhile, the display apparatus 100 may determine whether the registration for the user command belonging to the second threshold section is suitable as the control command or is suitable as the trigger command according to the registration request information of the user.

Meanwhile, according to an aspect of the present disclosure, after the display apparatus 100 determines similarity between the spoken voice of the user and a plurality of commands which are pre-registered or whether or not the spoken voice of the user corresponds to a prohibited command, the display apparatus 100 may determine registration suitability for the user command according to various exemplary embodiments described above. According to an exemplary embodiment, the display apparatus 100 determines registration suitability for the user command according to a degree of similarity between a plurality of pre-registered commands and the user command (first determination operation). As the determination result, if it is determined that the user command is similar to at least one of the plurality of commands, the display apparatus 100 determines that the registration for the user command is not suitable. Meanwhile, if it is determined that the user command is not similar to the plurality of commands, the display apparatus 100 may perform an operation of determining registration suitability for the user command according to various exemplary embodiments described above.

The display apparatus 100 according to an exemplary embodiment determines whether the user command is the unregistrable command with reference to the pre-registered prohibited commands (second determination operation). As the determination result, if the user command is associated with at least one prohibited command, the display apparatus 100 determines that the registration for the user command is not suitable. Meanwhile, if the user command is not associated with at least one prohibited command, the display apparatus 100 may perform the operation of determining registration suitability for the user command according to various exemplary embodiments described above.

In this case, the display apparatus 100 may perform at least one of the first determination operation of determining whether or not the user command is similar to the pre-registered command and the second determination operation of determining whether or not the corresponding user command is the prohibited command.

If registration suitability for the user command is primarily determined by at least one of the first determination operation and the second determination operation, the display apparatus 100 provides the registration suitability determination result for the user command. Specifically, if it is determined that the registration for the user command is not suitable, the display unit 100 displays the analysis result information analyzed according to the module determining registration suitability predetermined with regard to the suitability determination conditions and the guide UI guiding a registrable user command, on the screen thereof. Accordingly, the user may re-input or speak a registrable user command with reference to the guide UI displayed on the screen of the display apparatus 100. Meanwhile, if it is determined that the registration for the user command is suitable, the display apparatus 100 outputs an audio for the user command. After the audio for the user command described above is output, the display apparatus 100 may perform the registration for the corresponding user command according to the following operations.

Figure 10:
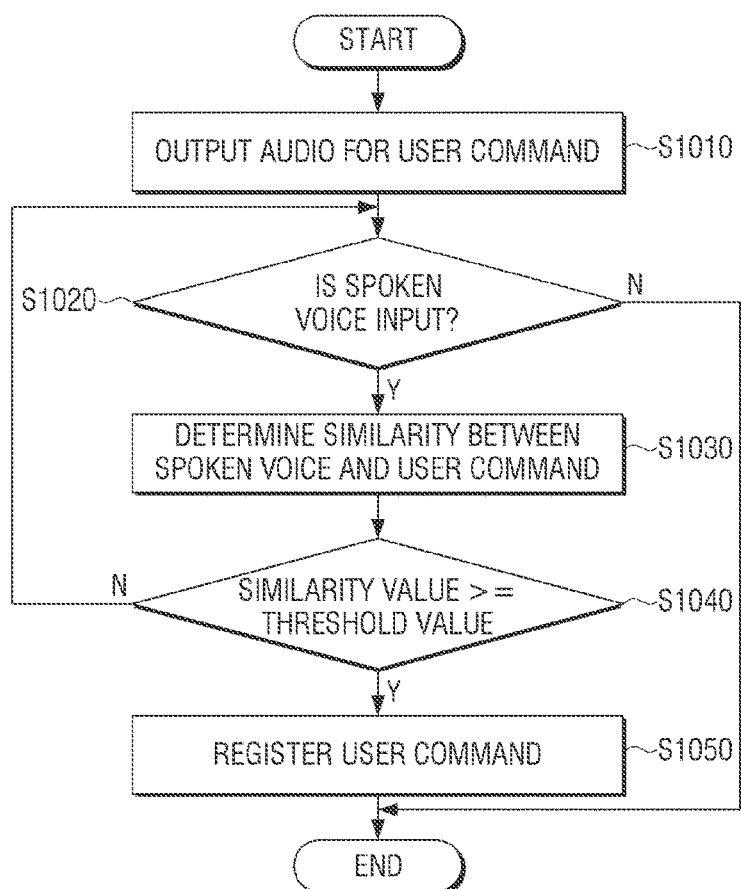
FIG. 10 is a flow chart of a method for registration of a user command in a display apparatus according to an exemplary embodiment of the present disclosure.

FIG. 10 is a flow chart of a method for registration of a user command in a display apparatus according to an exemplary embodiment of the present disclosure.

As illustrated in FIG. 10, if it is determined that the registration for the user command is suitable, the display apparatus 100 outputs the audio for the user command (operation S1010). Thereafter, the display apparatus 100 determines whether or not the spoken voice of the user is input within a predetermined threshold time (operation S1020). As the determination result, if the spoken voice is input within the predetermined threshold time, the display apparatus 100 registers the user command according to a degree of similarity between the text for the user command and the text for the input spoken voice (operation S1030 and operation S1040).

Specifically, if the spoken voice is input after the audio for the user command is output, the display apparatus 100 may convert the input spoken voice into the text type or receive the voice recognition result converted into the text type from the voice recognition apparatus 300. Thereafter, the display apparatus 100 measures similarity between the phonetic symbols for the user command and the phonetic symbols for the spoken voice using the similarity algorithm such as the confusion matrix, and requests a re-speaking if the similarity value according to the measurement is less than the predetermined threshold value. Thereafter, if the spoken voice of the user is re-input, the display apparatus 100 re-performs the above-mentioned operations (operation S1030 and operation S1040). If the similarity value measured between the user command and the spoken voice by the above-mentioned re-performing is the predetermined threshold value or more, or is less than the predetermined threshold value, the display apparatus 100 ends the operation of performing the registration for the user command. Meanwhile, if the similarity value measured between the user command and the spoken voice by the operation (operation S1040) is the predetermined threshold value or more, the display apparatus 100 registers and stores the user command (operation S1050). After the user command defined by the user is registered by the above-mentioned operations, the user may control the operation of the display apparatus 100 by the spoken voice associated with the pre-registered user command.

In addition, the method for registration of a user command as described above may be implemented in at least one execution program for executing the method for registration of a user command as described above, in which the execution program may be stored in a non-transitory computer readable medium.

The method for registration of a user command of the display apparatus according to various exemplary embodiments described above may be implemented in a program so as to be provided to the display apparatus. Particularly, the program including the method for registration of a user command of the display apparatus may be stored and provided in a non-transitory computer readable medium.

The non-transitory computer readable medium does not refer to a medium storing data for a short period such as a register, a cache, a memory, or the like, but refers to a machine-readable medium semi-permanently storing the data. Specifically, the programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

According to various exemplary embodiments of the present disclosure as described above, the display apparatus may register the user command, which is resistant to misrecognition and guarantees the high recognition rate, among the user commands defined by the user.

Hereinabove, the present disclosure has been described with reference to the exemplary embodiments thereof.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:
1. An electronic apparatus comprising:
a control command receiver;
a voice command receiver;
an outputter; and
a processor configured to:
based on receiving a control command requesting a registration of a user command word through the control command receiver, perform a voice recognition mode,
based on a received voice being a pre-registered user command word, control the outputter to output information corresponding to not registering the user command word, and
based on the received voice not being the pre-registered user command word, register the received voice as another user command word.

2. The electronic apparatus of claim 1, wherein the processor is further configured to, based on the received voice not being the pre-registered user command word, control the outputter of the electronic apparatus to output information corresponding to registering the received voice.

3. The electronic apparatus of claim 1, wherein the outputter is configured to include a display and a speaker, wherein the information is output as at least one of a UI displayed on the display and an audio signal output through the speaker.

4. A controlling method of an electronic apparatus comprising:
performing, by at least one processor of the electronic apparatus, operations including:
based on receiving a control command requesting a registration of a user command word through a control command receiver of the electronic apparatus, performing a voice recognition mode;
based on a received voice being a pre-registered user command word, controlling an outputter of the electronic apparatus to output information corresponding to not registering the user command word; and
based on the received voice not being the pre-registered user command word, registering the received voice as another user command word.

5. The method of claim 4, wherein the at least one processor is further configured to, based on the received voice not being the pre-registered user command word, controlling the outputter of the electronic apparatus to output information corresponding to registering the received voice.

6. The method of claim 4, wherein the information is output as at least one of a UI and an audio signal.

* * * * *